United States Patent [19]
Johnston

[11] Patent Number: 4,910,254
[45] Date of Patent: * Mar. 20, 1990

[54] FILMS OF OLEFIN POLYMERS AND GRAFT COPOLYMERS

[75] Inventor: Robert T. Johnston, Lake Jackson, Tex.

[73] Assignee: The Dow Chemical Company, Midland, Mich.

[*] Notice: The portion of the term of this patent subsequent to Sep. 1, 2004 has been disclaimed.

[21] Appl. No.: 100,642

[22] Filed: Sep. 24, 1987

[51] Int. Cl.$^4$ ................................................. C08L 51/08
[52] U.S. Cl. .......................................... 525/75; 525/70; 525/72; 525/76; 525/77; 525/78; 525/80; 525/84; 525/240; 525/931

[58] Field of Search ....................... 525/75, 84, 72, 76, 525/77, 78, 80

[56] References Cited

U.S. PATENT DOCUMENTS 4,690,976 9/1987 Hahnfeld ............................... 525/75

*Primary Examiner*—Jacob Ziegler

[57] ABSTRACT

A film prepared from a compatibilized resin blend comprising an olefin polymer, a polymer of a vinyl aromatic monomer and a compatibilizing amount of a graft copolymer of a vinyl aromatic monomer and an EPDM rubber exhibits improved properties making it highly desirable in such end uses as grocery and trash bags.

18 Claims, No Drawings

FILMS OF OLEFIN POLYMERS AND GRAFT COPOLYMERS

BACKGROUND OF THE INVENTION

The present invention relates to films, particularly films prepared by blown film extrusion techniques.

Olefin polymers are known to be usefully employed in the preparation of blown films. Particularly suitable olefin polymers include low density polyethylene and linear low density polyethylene. Films from such resins are usefully employed in a number of applications including the preparation of heavy duty shipping bags and grocery sacks. In such applications it is desirable to provide a film having increased modulus which improves the machine handling characteristics of the films. In addition, improved film dart impact resistance and film toughness are also highly desirable properties in order to resist puncture by the contents carried in a heavily loaded bag. Conventionally, polyethylene films meeting the requirements of such end uses have been prepared from blends of low density and high density polyethylene resins. Films prepared from such blends possess high tensile yield strength, but disadvantageously such films have a correspondingly reduced impact strength.

Another aspect of the present invention relates to the use of additives in polyolefin resins. Such additives include pigments and opacity additives to reduce film clarity particularly where surface printing is desired. Additional additives known as anti-blocking aids reduce the "cling" of thin polyolefin films. It would be desirable to provide an olefin polymer film having increased opacity thereby minimizing or eliminating the requirement of pigment loading to produce opacity. An additional desirable achievement would be to provide a film having inherently improved blocking thereby permitting reductions in the level of anti-blocking additives required to be added to such resin in order to achieve easy separation of film surfaces, as for example in opening of bags fabricated from such films.

In U.S. Pat. No. 4,579,912 there are disclosed films prepared from linear low density polyethylene and up to 10% by weight of the total composition of a thermoplastic polymer of an aromatic hydrocarbon. Disadvantageously such films as are disclosed by the above reference tend to be deficient in certain physical properties, particularly dart impact strength and toughness. Moreover, it would be desirable if there were provided a blown film having a better balance of film properties in the machine direction or direction of extrusion versus the transverse direction.

SUMMARY OF THE INVENTION

According to the present invention there is now provided an improved film prepared from a compatibilized blend comprising an olefin polymer, a polymer of a vinyl aromatic monomer and a compatibilizing amount of a graft copolymer prepared by polymerizing a vinyl aromatic monomer in the presence of from 0.5 to 20% based on monomer weight of a rubbery interpolymer of ethylene, propylene and a non-conjugated copolymerizable diene.

The films of the present invention are usefully prepared by known blown film or other suitable techniques and are employed in the preparation of packaging sacks, kitchen and trash bags, grocery sacks, etc. Films of the present invention demonstrate improved physical properties particularly improved dart impact strength and toughness, compared to films of an olefin polymer alone or a blend of an olefin polymer and a vinyl aromatic polymer, and exhibit an inherent increase in opacity thereby reducing the amount of pigment loading required to prepare opaque films and a reduction in blocking, thereby reducing the amount of anti-blocking additives added to the film.

DETAILED DESCRIPTION OF THE INVENTION

Olefin polymers suitably employed in the present invention include those olefin polymers well known in the art for use in the preparation of films. Examples include low, medium, and high density ethylene homopolymers as well as low, medium, and high density linear copolymers of ethylene and an α-olefin. Additional suitable examples of olefin polymers include those copolymers and interpolymers of ethylene containing a minor amount of copolymerizable polar comonomer particularly ethylenically unsaturated carboxylic acids and ester derivatives thereof such as acrylic acid, vinyl acetate, etc., or carbon monoxide. Preferred olefin polymers are low density polyethylene and linear low density polyethylene, i.e. copolymers of ethylene and higher olefins, particularly 1-butene, 1-hexene, or 1-octene. These linear low density polyethylene copolymers generally have a density of between about 0.90 and 0.94, preferably between 0.91 and 0.93.

The polymer of vinyl aromatic monomers usefully employed in the present invention includes homopolymers of one or more monomers selected from the group consisting of styrene, and $C_{1-4}$ ring alkylated or halogenated styrenes, containing from 1 to 4 ring substituents as well as copolymers of such monomers alone or with additional copolymerizable monomers. Examples of suitable copolymerizable comonomers include ethylenically unsaturated carboxylic acids, esters, nitrile or amides. The preferred polymer of a vinyl aromatic monomer is polystyrene. Highly desired film properties are obtained when the polymer of a vinyl aromatic monomer is present in an amount from about 0.5 to about 20% by weight, most preferable 1.0 to 10% based on total film weight.

Graft copolymers of vinyl aromatic monomers and a rubbery interpolymer of ethylene, propylene and a non-conjugated copolymerizable diene are previously well known in the art. Suitable techniques for the grafting of vinyl aromatic polymers onto such rubbery substrates have been taught in U.S. Pat. No. 3,489,822; 3,489,821; 3,642,950; 3,819,765; 4,340,669; and copending application Ser. No. 820,505, filed Jan. 21, 1986 in the name of Jerry N. Hahnfeld. The teachings of the above patents and the above patent application are hereby incorporated in their entirety by reference thereto.

Preferred non-conjugated copolymerizable dienes employed in the preparation of the rubbery interpolymers are 1,4-hexadiene, dicyclopentadiene and 5-ethylidene-2-norbornene. It is understood that the grafting polymerization generally does not result in complete grafting of the polymer of a vinyl aromatic to the rubbery substrate. Accordingly, and preferably, the polymer of a vinyl aromatic monomer employed in the present compatibilized polymer blend from which the film is prepared comprises the ungrafted or matrix polymer of a vinyl aromatic monomer prepared during the grafting process.

Most preferably, the rubbery interpolymer comprises from about 80 to 20% by weight ethylene from about 20 to 80% propylene and from about 1 to about 10 weight percent of the non-conjugated copolymerizable diene.

It is desirable according to the invention to achieve sufficient compatibilization of the polymer of a vinyl aromatic monomer and the olefin polymer. To this end the grafted phase of the graft copolymer should desirably have a molecular weight that is sufficient such that molecular entanglements occur with the polymer of a vinyl aromatic monomer. Suitably a molecular weight for such graft phase of at least about 20,000 is desired. In a most preferred embodiment the molecular weight of the grafted polymer and that of the ungrafted polymer are substantially the same.

It will be readily recognized by the skilled artisan that the weight ratio of grafted polymer to the rubbery interpolymer, referred to herein as G/R, will vary depending on the efficiency of the graft copolymerization reaction. Suitable films may be prepared utilizing blends wherein the graft copolymer has a G/R from about 0.1 to about 2.5. Preferably the G/R is from about 0.7 to about 2.0. Within such ranges the final film properties may be adjusted by utilizing greater or lesser amounts of such graft copolymer compatibilizer. That is, when utilizing such copolymers having a high degree of grafting, the skilled artisan may employ a lesser amount thereof to achieve comparable film properties.

Preferred resin compositions for preparing films comprise from 0.1 to about 3.0 weight percent graft copolymer when the olefin polymer is low density polyethylene and 0.2 to 5.0 weight percent graft copolymer when the olefin polymer is linear low density polyethylene. Additional additives may of course be included in the resin blend prior to preparation of the film. Such additives include pigments, fillers, antioxidants, flame retarding agents and the like. In addition, other elastomeric materials such as conjugated diene rubbers, rubbery block copolymers of a vinyl aromatic monomer and butadiene, additional amounts of ethylene/propylene/diene monomer rubbers or ethylene/propylene rubbers that are not grafted, blowing agents, etc. may also be included.

Films may be prepared by casting or extrusion techniques. Blown films are prepared according to known techniques by extruding the aforementioned resin blend and expanding the extrudate into a film by the use of compressed gas and optional mechanical devices. Examples of suitable techniques for the preparation of blown films may be found in U.S. Pat. No. 3,231,642, 4,112,034, 3,608,019 and 3,466,356 the teachings of which are herein incorporated by reference thereto.

Having described the invention the following nonlimiting examples are provided as further illustrative thereof. Unless otherwise noted, all parts and percentages are by weight.

EXAMPLE 1

In the following examples blends are prepared utilizing the following resins.

LDPE is low density polyethylene 535, a low density polyethylene having a 1.9 melt index and 0.92 grams/cc density. The resin is available from The Dow Chemical Company.

LLDPE is Dowlex ® 2045 linear low density polyethylene, having 1.0 melt index and 0.920 grams per cc density. The resin is available from The Dow Chemical Company.

PS is either Styron 685-D-2, a general purpose polystyrene, available from The Dow Chemical Company or where a graft copolymer compatibilizer (GP) is present, PS is the calculated amount of ungrafted polystyrene present in the graft copolymer.

GP is a graft copolymer of polystyrene and EPDM rubber (EPsyn ® 5508 EPDM available from Copolymer Rubber and Chemical Corporation) containing 15% rubber prepared by the hydroperoxide graft polymerization of styrene monomer in the presence of the rubber and having a G/R of approximately 1.0. The free polystyrene content of GP is approximately 70%.

Blends were prepared using a Werner-Pfleiderer twin screw compounding extruder, operated with temperature settings for the four extrusion zones adaptor and die of 150°/150°/163°/163°/177°/177° C. Blown films from the various blends tested were made using a HaakeBuchler, Rheocord ™ "System Forty" Drive Unit, a HaakeBuchler, Rheolex ™ "202" 20/1 L/D ¾" extruder, MPM ™ 1" diameter blown film die with 30 mil die gap, and a MPM ™ duel lip air ring tower and wind-up assembly. The films were made with 1.2 mil gauge, 6" layflat (approximately 3.8 BUR), and 24 fpm haul-off speed. The blown film extruder was operated at 100 rpm. Temperature settings were 175°/200°/200°/200°/200° C. for the two extruder zones, adaptor and two die zones, for the low density polyethylene samples. For linear low density polyethylene samples the temperature settings were 200°/225°/225°/225°/225° C. respectively. Results are contained in Table I.

TABLE I

| Run | Composition | | | | TY[1] | | Modulus[4] | | Tear[5] | | Impact[6] | % Haze |
| | PS | LDPE | LLDPE | GP | MD[2] | TD[3] | MD[2] | TD[3] | MD[2] | TD[3] | | |
| --- | --- | --- | --- | --- | --- | --- | --- | --- | --- | --- | --- | --- |
| 1* | — | 100 | — | — | 1799 | 1883 | 25750 | 25470 | 61 | 102 | 132 | 6.4 |
| 2* | 5 | 95 | — | — | 1835 | 1705 | 37840 | — | 49 | 82 | 100 | 24.2 |
| 3 | .7 | 99 | — | .3 | 1736 | 1721 | 25720 | 25910 | 70 | 112 | 130 | 16.7 |
| 4 | 1.4 | 98 | — | .6 | 1846 | 1788 | 26660 | 26450 | 70 | 118 | 123 | 24.4 |
| 5 | 3.5 | 95 | — | 1.5 | 1967 | 1926 | 28870 | 29130 | 61 | 125 | 128 | 52.0 |
| 6 | 7.0 | 90 | — | 3.0 | 2097 | 1920 | 35950 | 34110 | 38 | 96 | 90 | 74.6 |
| 7* | — | — | 100 | — | 1579 | 1645 | 24145 | 26215 | 422 | 500 | 345 | 8.5 |
| 8* | 1 | — | 99 | — | 1602 | 1665 | 28770 | 26700 | 446 | 515 | 315 | 13.1 |
| 9* | 2 | — | 98 | — | 1759 | 1661 | 29390 | 27070 | 356 | 517 | 332 | 14.1 |
| 10* | 5 | — | 95 | — | 1860 | 1643 | 38710 | 31130 | 299 | 578 | 278 | 25.4 |
| 11 | .7 | — | 99 | .3 | 1687 | 1628 | 24690 | 25890 | 426 | 525 | — | 13.5 |
| 12 | 1.4 | — | 98 | .6 | 1662 | 1690 | 26110 | 25720 | 378 | 512 | >960 | 11.0 |
| 13 | 3.5 | — | 95 | 1.5 | 1699 | 1649 | 30560 | 29200 | 250 | 416 | >960 | 23.4 |
| 14 | 10.5 | — | 85 | 4.5 | 2129 | 1880 | 47580 | 40240 | 246 | 294 | >960 | 34.7 |

TABLE I-continued

| Run | PS | LDPE | LLDPE | GP | TY[1] MD[2] | TY[1] TD[3] | Modulus[4] MD[2] | Modulus[4] TD[3] | Tear[5] MD[2] | Tear[5] TD[3] | Impact[6] | % Haze |
|---|---|---|---|---|---|---|---|---|---|---|---|---|
| 15 | 21 | | 70 | 9.0 | 2734 | 2546 | 72750 | 61000 | 144 | 182 | >960 | 51.3 |

*Comparative example
[1]Tensile Yield (lbs/in²)
[2]Machine direction
[3]Transverse direction
[4]2% Secant Modulus (lb/in²)
[5]Elmendorf tear-g.
[6]Dart Impact (Type A) 50% failure weight (g)

As can be seen by examination of Table I, the inclusion of a compatibilizing amount of the graft copolymer in a resin composition comprising a olefin polymer and a polymer of a vinyl aromatic monomer results in the preparation of a film having improved properties compared to either the olefin polymer alone or a blend of only the olefin polymer and the vinyl aromatic polymer. In particular, it is noted that an improvement in tensile yield, modulus and impact strength is readily obtained and that tear strength is not significantly adversely affected particularly at moderate content levels of the polymer of a vinyl aromatic monomer.

What is claimed is:

1. A cast or blown film prepared from a compatibilized blend comprising:
   (a) an olefin polymer,
   (b) a polymer of a vinyl monomer selected from the group consisting of homopolymers of styrene and $C_{1-4}$ ring alkylated or halogenated styrene containing from 1 to 4 ring substituents; copolymers of more than one monomer selected from the group consisting of styrene and $C_{1-4}$ ring alkylated or halogenated styrene containing from 1 to 4 ring substituents; and copolymers of styrene or $C_{1-4}$ alkylated or halogenated styrene containing from 1 to 4 ring substituents with a copolymerizable comonomer selected from the group consisting of ethylenically unsaturated carboxylic acids, esters, nitriles and amides, and
   (c) a compatibilizing amount of a graft copolymer prepared by polymerizing a vinyl aromatic monomer alone or with a copolymerizing ethylenically unsaturated carboxylic acid, ester, nitrile or amide in the presence of from 0.5 to 20% based on monomer weight of a rubbery interpolymer of ethylene, propylene and a non-conjugated copolymerizable diene.

2. A film according to claim 1 wherein the olefin polymer is low density polyethylene or linear low density polyethylene.

3. A film according to claim 1 wherein the vinyl aromatic monomer employed in both the graft polymer and the polymer of a vinyl aromatic monomer is styrene and the rubbery polymer is an interpolymer of ethylene, propylene and a diene selected from the group consisting of 1,4-hexadiene, dicyclopentadiene and 5-ethylidene-2-norbornene.

4. A film according to claim 1 comprising low density polyethylene and from 0.1 to about 3.0% by weight of a graft copolymer.

5. A film according to claim 1 comprising linear low density polyethylene and from 0.2 to about 5.0% by weight of a graft copolymer.

6. A film according to claim 1 wherein the graft copolymer comprises from about 1 to 5% based on monomer weight of a rubbery interpolymer.

7. The film according to claim 1, wherein the polymer of a vinyl aromatic monomer is present in an amount from 0.5 to 20 weight percent of the film.

8. The film according to claim 7, wherein the polymer of a vinyl aromatic monomer is present in an amount from 0.5 to 10 weight percent of the film.

9. The film according to claim 8, wherein the polymer of a vinyl aromatic monomer is present in an amount from 0.5 to less than 5 weight percent of the film.

10. A bag prepared from a film according to claim 1.

11. The bag according to claim 10 wherein the olefin polymer is low density polyethylene or linear low density polyethylene.

12. The bag according to claim 10 wherein the vinyl aromatic monomer employed in both the graft polymer and the polymer of a vinyl aromatic monomer is styrene and the rubbery polymer is an interpolymer of ethylene, propylene and a diene selected from the group consisting of 1,4-hexadiene, dicyclopentadiene and 5-ethylidene-2-norbornene.

13. The bag according to claim 10 comprising low density polyethylene and from 0.1 to about 3.0% by weight of a graft copolymer.

14. The bag according to claim 10 wherein the film comprises linear low density polyethylene and from 0.2 to about 5.0% by weight of a graft copolymer.

15. The bag according to claim 10 wherein the graft copolymer comprises from about 1 to 5% based on monomer weight of a rubbery interpolymer.

16. The bag according to claim 10, wherein the polymer of a vinyl aromatic monomer is present in an amount from 0.5 to 20 weight percent of the film.

17. The bag according to claim 16 wherein the polymer of a vinyl aromatic monomer is present in an amount from 0.5 to 10 weight percent of the film.

18. The bag according to claim 17, wherein the polymer of a vinyl aromatic monomer is present in an amount from 0.5 to less than 5 weight percent of the film.

* * * * *

UNITED STATES PATENT AND TRADEMARK OFFICE
CERTIFICATE OF CORRECTION

PATENT NO. : 4,910,254

DATED : March 20, 1990

INVENTOR(S) : Robert T. Johnston

It is certified that error appears in the above-identified patent and that said Letters Patent is hereby corrected as shown below:

In Claim 1, at Column 5, line 46, "copolymerizing" should correctly appear as --copolymerizable--.

Signed and Sealed this

Second Day of July, 1991

Attest:

HARRY F. MANBECK, JR.

*Attesting Officer*  *Commissioner of Patents and Trademarks*